(12) United States Patent
Narita

(10) Patent No.: US 11,303,771 B2
(45) Date of Patent: Apr. 12, 2022

(54) IMAGE PROCESSING APPARATUS WITH DIRECT PRINT FUNCTION, CONTROL METHOD THEREFOR, AND STORAGE MEDIUM

(71) Applicant: CANON KABUSHIKI KAISHA, Tokyo (JP)

(72) Inventor: Tateki Narita, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/502,166

(22) Filed: Jul. 3, 2019

(65) Prior Publication Data

US 2020/0036846 A1 Jan. 30, 2020

(30) Foreign Application Priority Data

Jul. 26, 2018 (JP) .............................. JP2018-140746

(51) Int. Cl.
*H04N 1/00* (2006.01)
*G06F 3/12* (2006.01)
*G06K 15/02* (2006.01)

(52) U.S. Cl.
CPC ....... *H04N 1/00506* (2013.01); *H04N 1/0044* (2013.01); *H04N 1/00411* (2013.01); *H04N 1/00482* (2013.01)

(58) Field of Classification Search
None
See application file for complete search history.

(56) References Cited

U.S. PATENT DOCUMENTS

| | | | | |
|---|---|---|---|---|
| 6,094,230 A | * | 7/2000 | Han | H04N 5/45 348/564 |
| 6,894,803 B1 | * | 5/2005 | Haneda | G03B 27/52 348/209.99 |
| 8,391,593 B2 | * | 3/2013 | Lin | G06T 11/60 382/164 |
| 8,819,556 B1 | * | 8/2014 | Balev | G06T 11/60 715/723 |
| 2004/0168130 A1 | * | 8/2004 | Ishizaki | G06T 11/60 715/255 |
| 2006/0221411 A1 | * | 10/2006 | Aoki | H04N 1/00795 358/474 |

(Continued)

FOREIGN PATENT DOCUMENTS

JP 2008244872 A 10/2008

OTHER PUBLICATIONS

Anoopama Kasturi and Halavath Balaji, "PRINTIN", Dec. 1, 2017, 2017 IEEE International Conference on Computational Intelligence and Computing Research (ICCIC) (pp. 1-6) (Year: 2017).*

*Primary Examiner* — Beniyam Menberu
(74) *Attorney, Agent, or Firm* — Rossi, Kimms & McDowell LLP

(57) ABSTRACT

An image processing apparatus which enables a user to easily make a determination as to a trimmed image. The image processing apparatus generates a trimmed image based on image data by trimming a part of an image and displays the generated trimmed image. The image processing apparatus has at least one controller. The controller obtains format information on the image data, and based on at least the obtained format information, determines a trimming position for generating the trimmed image based on the image data.

16 Claims, 10 Drawing Sheets

(56) References Cited

U.S. PATENT DOCUMENTS

| | | | | |
|---|---|---|---|---|
| 2008/0181512 A1* | 7/2008 | Gavin | ............... | G06T 11/60 |
| | | | | 382/209 |
| 2009/0295787 A1* | 12/2009 | Yao | ............... | G06T 11/00 |
| | | | | 345/418 |
| 2010/0013950 A1* | 1/2010 | Kikuchi | ............... | H04N 1/3872 |
| | | | | 348/222.1 |
| 2013/0194444 A1* | 8/2013 | Hikida | ............... | H04N 5/23296 |
| | | | | 348/211.9 |
| 2014/0267435 A1* | 9/2014 | Choe | ............... | G06T 11/60 |
| | | | | 345/660 |
| 2015/0310585 A1* | 10/2015 | Gupta | ............... | G06T 3/0025 |
| | | | | 382/199 |
| 2016/0014296 A1* | 1/2016 | Saka | ............... | H04N 1/41 |
| | | | | 358/3.24 |
| 2016/0048729 A1* | 2/2016 | Kuno | ............... | G06K 9/00456 |
| | | | | 382/176 |
| 2016/0357717 A1* | 12/2016 | Metz | ............... | G09G 5/005 |
| 2017/0026584 A1* | 1/2017 | Park | ............... | H04N 5/23293 |
| 2018/0054533 A1* | 2/2018 | Makino | ............... | H04N 1/00461 |
| 2018/0234577 A1* | 8/2018 | Mizude | ............... | H04N 1/10 |
| 2019/0147103 A1* | 5/2019 | Bhowan | ............... | G06K 9/4628 |
| | | | | 707/737 |

* cited by examiner

FIG. 4

| | | | |
|---|---|---|---|
| ORDER SHEET | | ORDER NUMBER | 2010BX-052 |
| | | DATE OF ORDER | November 2, 2010 |

XXXX CORPORATION

WE WOULD LIKE TO PLACE  YYYY CORPORATION
AN ORDER AS FOLLOWS.    ADDRESS
                        TEL 99-9999-9999 / FAX 99-9999-9999

SUBJECT    CENTRAL LOCKING SYSTEM

AMOUNT    ¥ 4,084,500— (CONSUMPTION TAX EXCLUDED)

DEADLINE FOR DELIVERY   JANUARY 20, 2011
PLACE FOR DELIVERY      KOSUGI OFFICE OF OUR COMPANY
PAYMENT CONDITION       FACTORING SYSTEM

| ITEM NAME | QUANTITY | PRICE | AMOUNT |
|---|---|---|---|
| ITEM A | 1.00 | ¥ 1,250,000 | ¥ 1,250,000 |
| ITEM B | 1.00 | ¥ 450,000 | ¥ 450,000 |
| ITEM C | 1.00 | ¥ 750,000 | ¥ 750,000 |
| ITEM D | 1.00 | ¥ 450,000 | ¥ 450,000 |
| ITEM E | 1.00 | ¥ 194,500 | ¥ 194,500 |
| | | | |
| | | | |
| | | | |
| | | | |
| | | TOTAL | ¥ 4,084,500 |

SPECIAL NOTE    THE ORDERED ITEM IS A SYSTEM WITH SECURITY LEVEL "6" AND
                THUS ACCOMPANIED BY ISSUANCE OF A SECURITY CERTIFICATE
                AT THE TIME OF DELIVERY.

FOR AN INQUIRY ABOUT THIS ORDER, PLEASE CONTACT PURCHASING PERSONNEL. WE DO
NOT RESPOND TO DIRECT INQUIRY TO ORDER PERSONNEL.

ORDER SHEET  ORDER NUMBER 2010BX062
DATE OF ORDER November 2, 2010

XXXX CORPORATION

WE WOULD LIKE TO PLACE    YYYY CORPORATION
AN ORDER AS FOLLOWS.      ADDRESS
                          TEL 99-9999-9999 / FAX 99-999-9999

SUBJECT  CENTRAL LOCKING SYSTEM
AMOUNT   ¥ 4,084,500 — (CONSUMPTION TAX EXCLUDED)

DEADLINE FOR DELIVERY  JANUARY 20, 2011
PAYMENT CONDITION  FACTORING SYSTEM

| ITEM NAME | QUANTITY | PRICE | AMOUNT |
|---|---|---|---|
| ITEM A | 1.00 | ¥ 1,250,000 | ¥ 1,250,000 |
| ITEM B | 1.00 | ¥ 450,000 | ¥ 450,000 |
| ITEM C | 1.00 | ¥ 750,000 | ¥ 750,000 |
| ITEM D | 1.00 | ¥ 450,000 | ¥ 450,000 |
| ITEM E | 1.00 | ¥ 184,500 | ¥ 184,500 |
|  |  |  |  |
|  |  |  |  |
|  |  |  |  |
|  |  | TOTAL | ¥ 4,084,500 |

SPECIAL NOTE   THE ORDERED ITEM IS A SYSTEM WITH SECURITY LEVEL "6" AND
               THUS ACCOMPANIED BY ISSUANCE OF A SECURITY CERTIFICATE
               AT THE TIME OF DELIVERY.

FOR AN INQUIRY ABOUT THIS ORDER, PLEASE CONTACT PURCHASING PERSONNEL. WE DO
NOT RESPOND TO DIRECT INQUIRY TO ORDER PERSONNEL.

FIG. 10

ORDER SHEET     ORDER NUMBER 2010BX-052
DATE OF ORDER November 2, 2010

XXXX CORPORATION

WE WOULD LIKE TO PLACE    YYYY CORPORATION
AN ORDER AS FOLLOWS.      ADDRESS
TEL 99-9999-9999 / FAX 99-9999-9999

SUBJECT    CENTRAL LOCKING SYSTEM
AMOUNT    ¥ 4,084,500— (CONSUMPTION TAX EXCLUDED)

DEADLINE FOR DELIVERY    JANUARY 20, 2011
PLACE FOR DELIVERY      KOSUGI OFFICE OF OUR COMPANY
PAYMENT CONDITION      FACTORING SYSTEM

| ITEM NAME | QUANTITY | PRICE | AMOUNT |
|---|---|---|---|
| ITEM A | 1.00 | ¥ 1,250,000 | ¥ 1,250,000 |
| ITEM B | 1.00 | ¥ 450,000 | ¥ 450,000 |
| ITEM C | 1.00 | ¥ 750,000 | ¥ 750,000 |
| ITEM D | 1.00 | ¥ 450,000 | ¥ 450,000 |
| ITEM E | 1.00 | ¥ 194,500 | ¥ 194,500 |
|  |  | TOTAL | ¥ 4,084,500 |

SPECIAL NOTE    THE ORDERED ITEM IS A SYSTEM WITH SECURITY LEVEL "6" AND THUS ACCOMPANIED BY ISSUANCE OF A SECURITY CERTIFICATE AT THE TIME OF DELIVERY.

FOR AN INQUIRY ABOUT THIS ORDER, PLEASE CONTACT PURCHASING PERSONNEL. WE DO NOT RESPOND TO DIRECT INQUIRY TO ORDER PERSONNEL.

1002    1001

IMAGE PROCESSING APPARATUS WITH DIRECT PRINT FUNCTION, CONTROL METHOD THEREFOR, AND STORAGE MEDIUM

BACKGROUND OF THE INVENTION

Field of the Invention

The present invention relates to an image processing apparatus, a control method therefor, and a storage medium.

Description of the Related Art

An MFP which is an image processing apparatus with a direct print function of obtaining image data such as photo data and document data from a USB memory and printing the obtained image data is known. In a case where a plurality of pieces of image data is stored in a USB memory connected to the MFP, the MFP previews image data on an operating unit so that a user can easily select image data to be printed. When previewing image data, for example, the MFP displays a plurality of images, which is formed based on respective pieces of obtained images, as thumbnails (see, for example, Japanese Laid-Open Patent Publication (Kokai) No. 2008-244872).

A display area in the operating unit of the MFP in which images are displayed is limited, and hence when displaying a plurality of images as thumbnails on the operating unit, the MFP cannot display all of the images. For this reason, when displaying images as thumbnails, the MFP displays trimmed images, which are obtained by trimming predetermined areas from images (hereafter referred to as original images) formed based on respective pieces of image data, on the operating unit as substitutes for the original images. For example, the MFP displays a trimmed image, which is obtained by trimming a central area 902 from an original image 901 in FIG. 9, on the operating unit as a substitute for the original image 901. A user selects a trimmed image including a characteristic part of an original image from a plurality of trimmed images displayed on the operating unit and gives an instruction to print image data corresponding to the selected trimmed image.

However, if central areas are trimmed from all original images as described above, a trimmed image including no characteristic part of an original image may be generated. For example, a trimmed image obtained by trimming a central area 1002 from an original image 1001 in FIG. 10 formed based on document data does not include a characteristic part of the original image 1001 such as a title on the first line of a document but includes only a middle section of the document. With this information alone, a user cannot determine whether or not the trimmed image is one corresponding to the original image 1001.

SUMMARY OF THE INVENTION

The present invention provides an image processing apparatus and a control method therefor which enable a user to easily make a determination as to a trimmed image, as well as a storage medium.

Accordingly, the present invention provides an image processing apparatus that generates a trimmed image based on image data by trimming a part of an image and displays the generated trimmed image, comprising at least one controller configured to function as an obtaining unit that obtains format information on the image data, and a determination unit that, based on at least the obtained format information, determines a trimming position for generating the trimmed image based on the image data.

According to the present invention, a user can easily make a determination as to a trimmed image.

Further features of the present invention will become apparent from the following description of exemplary embodiments (with reference to the attached drawings).

BRIEF DESCRIPTION OF THE DRAWINGS

FIG. 4 is a view useful in explaining a trimming position determined in step S307 in FIG. 3.

FIGS. 8A and 8B are views useful in explaining a trimming position determined in the process in FIG. 7.

FIG. 10 is a view useful in explaining how a trimmed image corresponding to document data is generated.

DESCRIPTION OF THE EMBODIMENTS

An embodiment of the present invention will now be described in detail with reference to the drawings. It should be noted that in the following description, the present invention is applied to an MFP which is an image processing apparatus, but the present invention is not limited to the MFP. For example, the present invention may be applied to apparatuses which preview a plurality of pieces of image data such as a digital electrophotographic copier, a laser printer, a facsimile, a client PC, and a mobile terminal which preview a plurality of pieces of image data.

Figure 1:
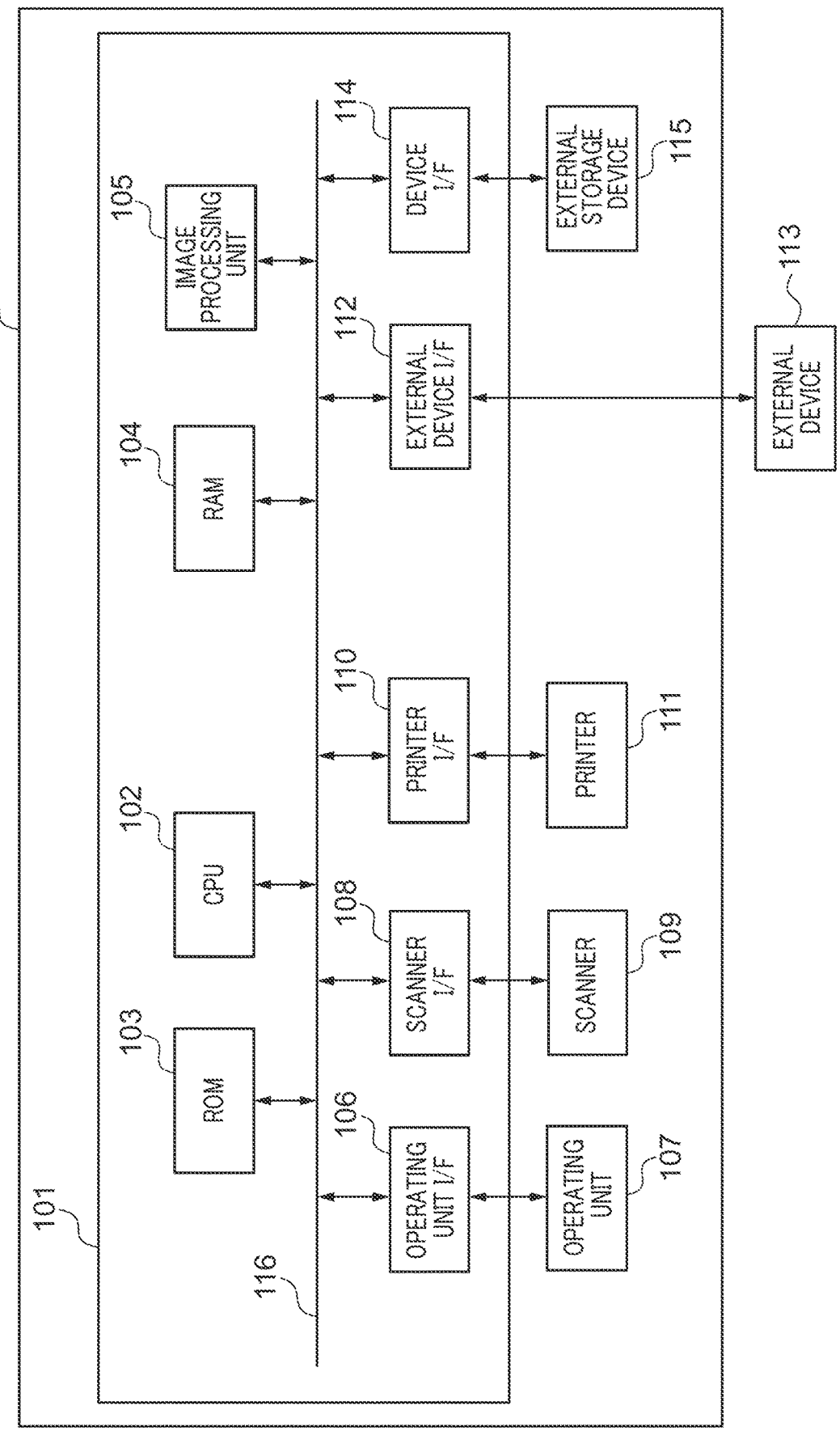
FIG. 1 is a block diagram schematically showing an arrangement of an MFP which is an image processing apparatus according to an embodiment of the present invention.

FIG. 1 is a block diagram schematically showing an arrangement of the MFP 100 which is the image processing apparatus according to the embodiment of the present invention. Referring to FIG. 1, the MFP 100 has a controller 101, an operating unit 107, a scanner 109, a printer 111, and an external storage device 115. The controller 101 is connected to the operating unit 107, the scanner 109, the printer 111, and the external storage device 115. The controller 101 has a CPU 102, a ROM 103, a RAM 104, an image processing unit 105, an operating unit I/F 106, a scanner I/F 108, a printer I/F 110, an external device I/F 112, and a device I/F 114. The CPU 102, the ROM 103, the RAM 104, the image processing unit 105, the operating unit I/F 106, the scanner I/F 108, the printer I/F 110, the external device I/F 112, and the device I/F 114 are connected to one another via a system bus 116.

The controller 101 is a central processing unit (processor) which performs computations for controlling the entire MFP 100. The CPU 102 carries out various processes based on programs stored in the ROM 103. The ROM 103 is a read-only memory. The ROM 103 stores, for example, a system startup program, a control program for a printer engine (not shown) of the MFP 100, character data information, and character code information. The RAM 104 is a random-access memory. The RAM 104 is used as a work area for the CPU 102 and also used as a temporary storage area for received image data and others.

The image processing unit 105 performs image processing on image data. For example, the image processing unit 105 performs an enlarging process and a reducing process on image data displayed on the operating unit 107. The operating unit I/F 106 is an I/F for connecting the operating unit 107 to the controller 101. The operating unit 107 has a touch-screen display unit (not shown). For example, a setting state of the MFP 100, an operating state of the MFP 100, and a preview image of data to be processed are displayed on the display unit. The scanner I/F 108 is an I/F for connecting the scanner 109 to the controller 101. The scanner I/F 108 controls, for example, transmission of data from the scanner 109 to the controller 101. The scanner 109 reads an original, which is a sheet medium, with its optical sensor (not shown), and based on information read off the original, generates a scan image. The printer I/F 110 is an I/F for connecting the printer 111 to the controller 101. The printer I/F 110 controls, for example, transmission of data from the controller 101 to the printer 111. The printer 111 prints photo data and document data obtained from an external device 113, the external storage device 115, and so forth. The external device I/F 112 carries out data communications with the external device 113 via a LAN, a fax line, and so forth. The device I/F 114 carries out data communications with the external storage device 115 connected to the MFP 100. The external storage device 115 is a storage medium such as a USB memory.

With the arrangement described above, the MFP 100 implements such print functions as a direct print function, a PDL function, a fax function, and a copy function. With the direct print function, the MFP 100 receives image data in such data formats as JPEG, TIFF, and PDF from the external storage device 115 and prints the received image data. With the PDL function, the MFP 100 receives print data described in PDL (page-description language) from the external device 113 and prints the received print data. With the fax function, the MFP 100 receives fax data from the external device 113 and prints the received fax data. With the copy function, the MFP 100 prints a scan image generated by the scanner 109.

With these print functions, the MFP 100 displays a preview image of image data prior to printing on the operating unit 107. For example, with the direct print function, the MFP 100 converts image data read out from the external storage device 115 into RAW image data with the image processing unit 105. The MFP 100 also enlarges or reduces the RAW image data to a predetermined display size to obtain an enlarged or reduced preview image and displays it on the operating unit 107. When the preview image displayed on the operating unit 107 is selected by a user, and then a print instruction from the user is received, the MFP 100 starts printing image data corresponding to the selected preview image.

Figure 2A:
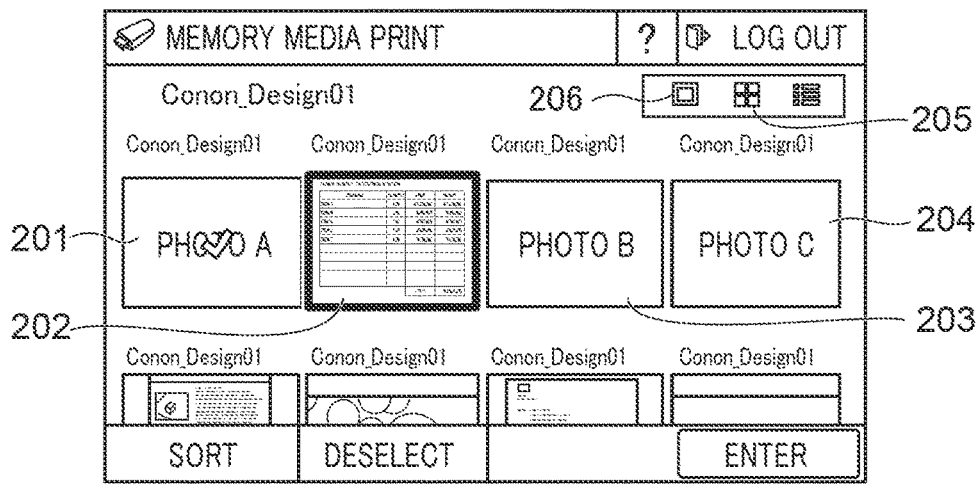
FIG. 2A to 2C are views useful in explaining previews displayed on the MFP in FIG. 1.

In the MFP 100, images are previewed in one of the following display modes, a thumbnail display mode, a normal display mode, and a full screen display mode. In the thumbnail display mode, a plurality of images such as preview images 201 to 204 of four pieces of image data are displayed on the operating unit 107 as shown in FIG. 2A. In the thumbnail display mode, by depressing at least one of the preview images 201 to 204, the user can select image data corresponding to the depressed preview image as an object to be printed. Also, by depressing the same preview image again, the user can deselect the image data as the object to be printed. In the thumbnail display mode, each of the preview images 201 to 204 is displayed in, for example, a display size (hereafter referred to as "the thumbnail display size") of 160×120 pixels. On the operating unit 107, a thumbnail display icon 205 is highlighted while thumbnails are displayed, and when the user depresses a normal display icon 206, the display mode switches from the thumbnail display mode switches to the normal display mode. The user switches from the thumbnail display mode to the normal display mode when it is impossible to identify corresponding image data from a preview image displayed as a thumbnail.

Figure 2B:
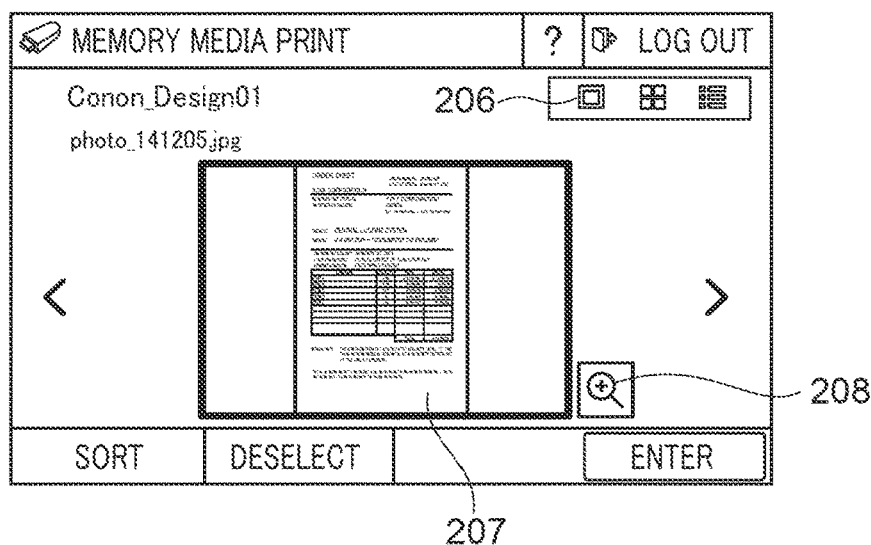

In the normal display mode, a preview image 207 of one piece of image data is displayed on the operating unit 107 as shown in FIG. 2B. The preview image 207 is a preview image of the same image data as the preview image 202 but is displayed in a larger display size than the preview mage 202. The preview image 207 is displayed in, for example, a display size of 320×240 pixels. As with the thumbnail display mode, in the normal display mode, by depressing the preview image 207, the user can select image data corresponding to the depressed preview image 207 as an object to be printed. Also, by depressing the preview image 207 again, the user can deselect the image data as the object to be printed. On the operating unit 107, the normal display icon 206 is highlighted during normal display, and when the user depresses an enlarged display icon 208, the display mode switches from the normal display mode to the full screen display mode.

Figure 2C:
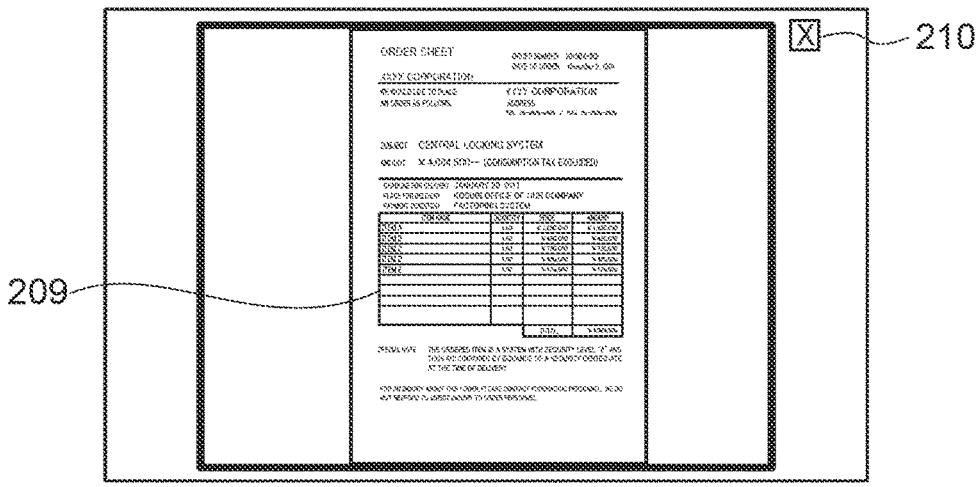

In the full screen display mode, a preview image 209 which is an enlarged image of the preview image 207 displayed in the normal display mode is displayed in full screen on the operating unit 107 as shown in FIG. 2C. The preview image 209 is displayed in, for example, a display size of 640×480 pixels. On the operating unit 107, when the user depresses a close button 210, the display mode switches from the full screen display mode to the normal display mode.

Figure 9:
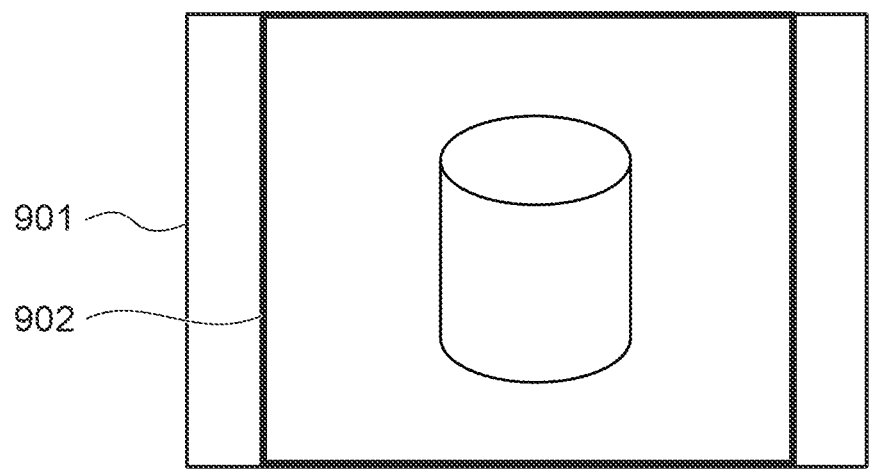
FIG. 9 is a view useful in explaining how a trimmed image corresponding to photo data is generated.

In the present embodiment, preview images are displayed in display sizes appropriate to the respective display modes described above, but there may be a case where an aspect ratio of an original image formed based on image data does not match that of a display size, and even when the original image is enlarged or reduced, it may not fit into the display size. In this case, for example, in the normal display mode or the full screen display mode, control is provided such that the entire preview image is displayed. Specifically, the original image is enlarged or reduced so that the length of long sides constituting the original image can match the length of the corresponding one side of the display size. On the other hand, in the thumbnail display size, the original image is reduced (or enlarged) so that the length of short sides constituting the original image can match the length of the corresponding one side of the display size, and the reduced image is trimmed at a predetermined trimming position. For example, when the image 901 in FIG. 9 in the PEG format obtained by reducing an original image formed based on photo data is trimmed in the center of the long sides, a trimmed image obtained by trimming the central area 902 from the image 901 is displayed as a preview image on the operating unit 107. The trimmed image includes a subject image which is a characteristic part of the original image. The characteristic part included in the trimmed image enables the user to determine that the trimmed image is a preview image corresponding to the original image. On the other hand, a trimmed image obtained by trimming the central area 1002 from the image 1001 in FIG. 10, which is a reduced image of an original image formed based on document data, does not include a characteristic part of the original image such as a title on the first line of a document but includes only a middle section of the document. With this information alone, the user cannot make a determination as to whether or not the trimmed image is a trimmed image corresponding to the original image 1001.

To cope with this, in the present embodiment, a type of image data is determined based on a data format of the image data and an image aspect ratio of an original image, and based on a result of the determination, a trimming position is switched.

Figure 3:
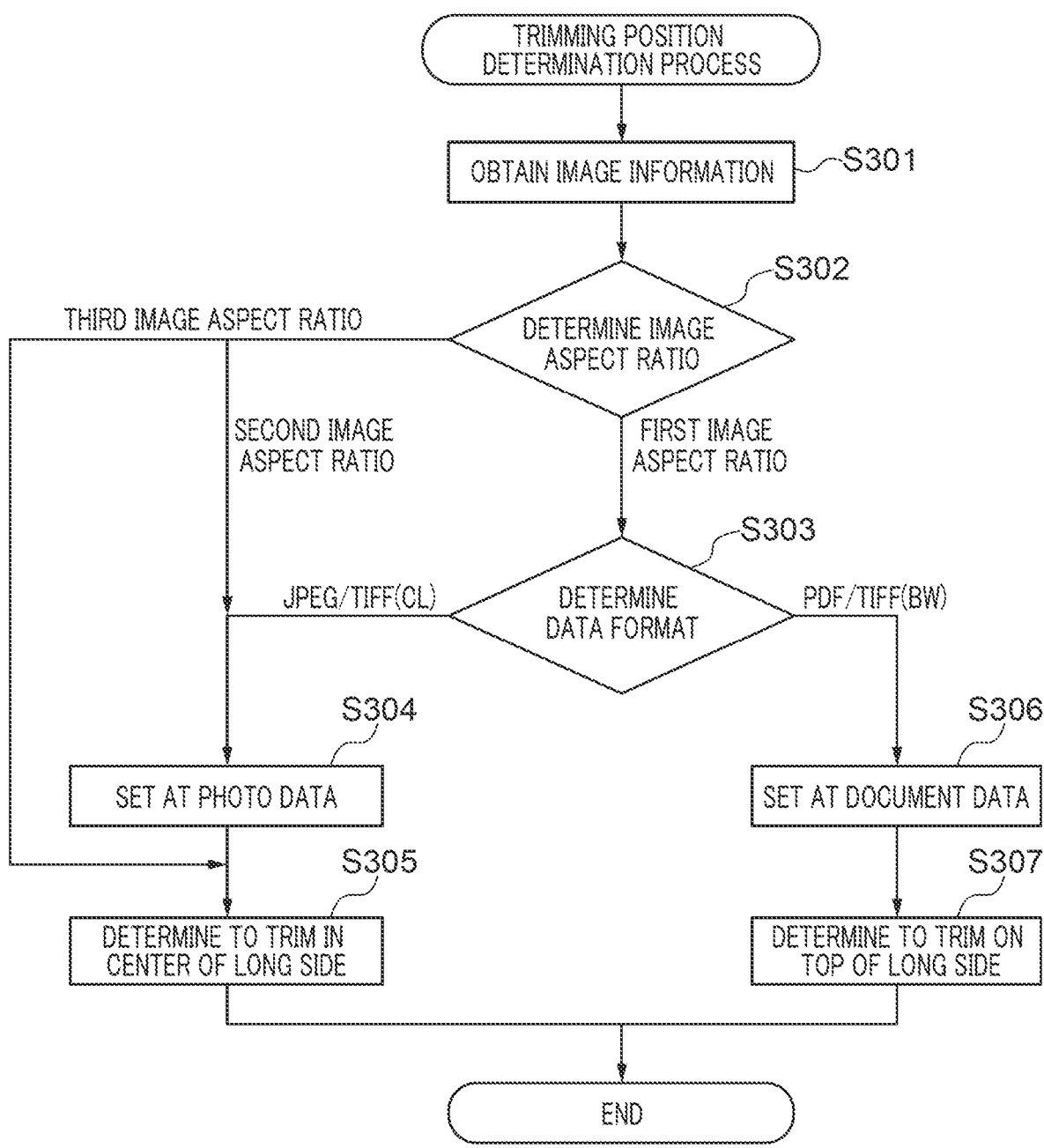
FIG. 3 is a flowchart showing the procedure of a trimming position determination process which is carried out by the MFP in FIG. 1.

FIG. 3 is a flowchart showing the procedure of a trimming position determination process which is carried out by the MFP 100 in FIG. 1. The process is implemented by the CPU 102 executing a program stored in the ROM 103 or the like. The process in FIG. 3 is carried out when the operating unit 107 has received a thumbnail display instruction issued by, for example, the user depressing the thumbnail display icon 205. It should be noted that the process in FIG. 3 is based on the assumption that a plurality of pieces of image data obtained from the external storage device 115 is stored in the RAM 104. The process in FIG. 3 is carried out for each piece of image data stored in the RAM 104. In the following description, for example, the process is carried out for a piece of image data stored in the RAM 104.

Referring to FIG. 3, first, the CPU 102 obtains image information included in a piece of image data stored in the RAM 104 (step S301). The image information includes information on an image aspect ratio of an original image formed based on the piece of image data and information on a data format of the piece of image data. The information on the data format of the piece of image data is, for example, information indicating one of the following, JPEG, TIFF (CL), TIFF (BW), and PDF. TIFF (CL) is a data format of image data comprised of a color image. TIFF (BW) is a data format of image data comprised of a monochrome image. Next, the CPU 102 determines the image aspect ratio of the original image (step S302). Specifically, in the step S302, the CPU 102 determines whether the image aspect ratio of the original image is a first image aspect ratio, a second image aspect ratio, or a third image aspect ratio. The first image aspect ratio is the same aspect ratio as that of regular sizes of printer paper, which is stored in advance in the ROM 103. The second image aspect ratio is 4:3 indicating L sizes. The third image aspect ratio is an aspect ratio other than the first image aspect ratio and the second image aspect ratio.

As a result of the determination in the step S302, when the image aspect ratio of the original image is the first image aspect ratio (regular sizes of printer paper), the CPU 102 determines a data format of the piece of image data (step S303).

As a result of the determination in the step S303, when the data format of the piece of image data is JPEG or TIFF (CL), or as a result of the determination in the step S302, when the image aspect ratio of the original image is the second image aspect ratio (L sizes), the CPU 102 sets "photo data" as a setting value indicating a type of the piece of image data (step S304) and stores this setting value in the RAM 104. When image data is photo data, for example, a central area of the image 901 is very likely to include a subject image which is a characteristic part of the image 901. For this reason, when image data is photo data, it is preferable that a trimming position for generating a trimmed image of the piece of image data is set in a central area of the image so that the user can easily make a determination as to the trimmed image. Then, the CPU 102 determines the center of the long side, which indicates a central area of the image, as a trimming position (step S305) and ends the present process.

As a result of the determination in the step S303, when the data format of the piece of image data is PDF or TIFF (BW), the CPU 102 sets "document data" as a setting value indicating a type of the piece of image data (step S306) and stores this setting value in the RAM 104. When image data is document data, for example, an upper area of the image 1001 is very likely to include a title or the like which is a characteristic part of the image 1001. For this reason, when image data is document data, it is preferable that a trimming position for generating a trimmed image of the piece of image data is set in an upper area of the image so that the user can easily make a determination as to the trimmed image. Then, the CPU 102 determines the top of the long side, which indicates an upper area of the image, as a trimming position (step S307) and ends the present process. When the top of the long side is set as the trimming position, for example, a trimmed image obtained by trimming an area 402 from the image 401 (processed image) in FIG. 4, which is a reduced image of an original image formed based on document data, is displayed as a preview image on the operating unit 107.

As a result of the determination in the step S302, when the image aspect ratio of the original image is the third image aspect ratio (others), the CPU 102 carries out the processes in the step S305 and the subsequent steps. After completing the processes on the piece of image data, the CPU 102 carries out the processes for other image data stored in the RAM 104 as well.

According to the process in FIG. 3 described above, a type of image data is determined based on a data format of image data and an image aspect ratio of an original image, and a trimming position is switched based on a result of the determination. As a result, when a trimmed image is to be generated, a trimming position is controlled based on a type of image data such that a characteristic part of an original image is included in the trimmed image, and this enables the user to easily make a determination as to the trimmed image.

Moreover, according to the process in FIG. 3 described above, when image data is photo data, the center of the long side is determined as a trimming position, and when image data is document data, the top of the long side is determined as a trimming position. As a result, a trimming position is controlled appropriately to a type of obtained image data.

It should be noted that a trimmed image may be generated by trimming a predetermined area determined by a trimming position from an original image, not a reduced image thereof.

Moreover, in the embodiment described above, a trimming position may be switched based on an image aspect ratio of an original image.

Figure 5:
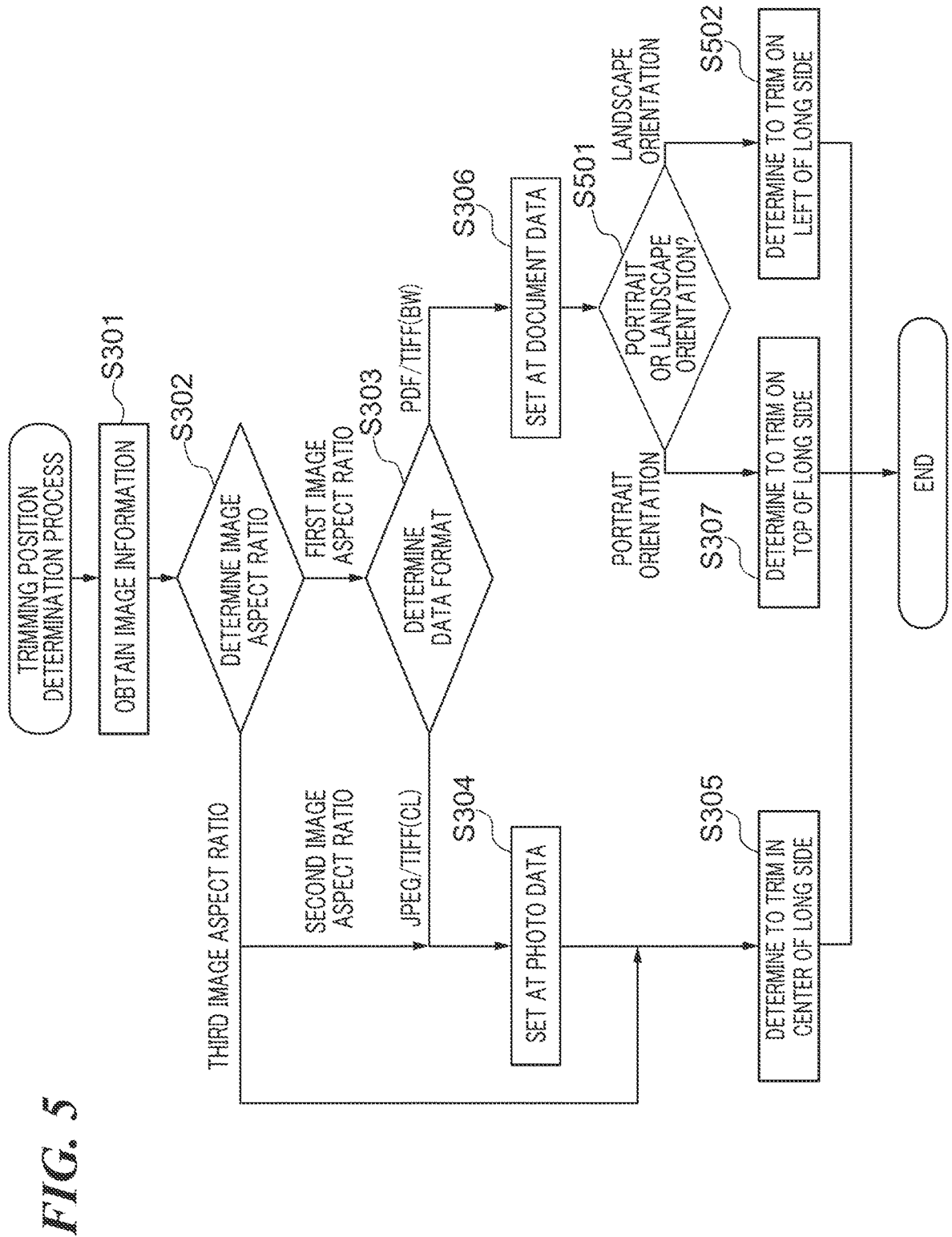
FIG. 5 is a flowchart showing the procedure of a first variation of the trimming position determination process in FIG. 3.

FIG. 5 is a flowchart showing the procedure of a first variation of the trimming position determination process in FIG. 3. The process in FIG. 5 is also implemented by the CPU 102 executing a program stored in the ROM 103 or the like. The process in FIG. 5 is also carried out when the operating unit 107 has received a thumbnail display instruction issued by, for example, the user depressing the thumbnail display icon 205. It should be noted that the process in FIG. 5 is also based on the assumption that a plurality of pieces of image data obtained from the external storage device 115 is stored in the RAM 104. The process in FIG. 5 is also carried out for each piece of image data stored in the RAM 104. In the following description, for example, the process is carried out for a piece of image data stored in the RAM 104.

Figure 6:
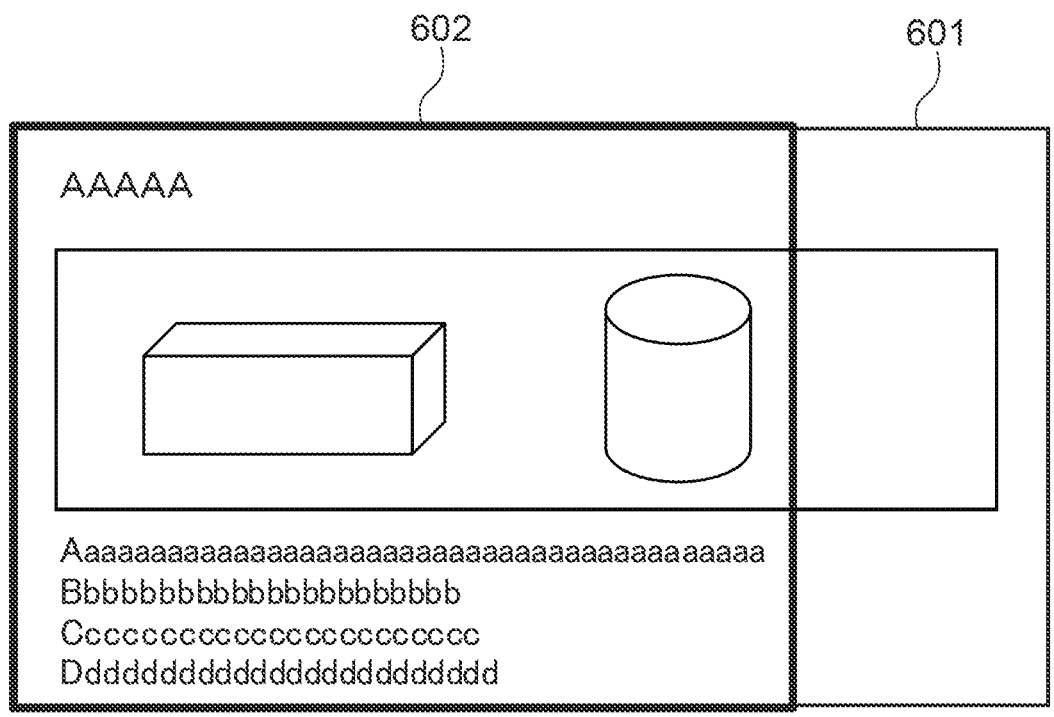
FIG. 6 is a view useful in explaining a trimming position determined in step S502 in FIG. 5.

Referring to FIG. 5, first, the CPU 102 carries out the processes in the steps S301 to S306. Next, based on an image aspect ratio of an original image, the CPU 102 determines whether an original image of the piece of image data is in portrait orientation or landscape orientation (step S501). When the original image of the piece of image data is in portrait orientation, for example, an upper area of the image 1001 is very likely to include a title or the like which is a characteristic part of the image 1001. For this reason, when an original image of a piece of image data is in portrait orientation, it is preferable that a trimming position for generating a trimmed image of the piece of image data is set in an upper area of the image so that the user can easily make a determination as to the trimmed image. On the other hand, when the original image of the piece of image data is in landscape orientation, for example, a left area of an image 601 in FIG. 6 is likely to include a title which is a characteristic part of the image 601. For this reason, when the original image of the piece of image data is in landscape orientation, it is preferable that a trimming position for generating a trimmed image of the piece of image data is set in the left area of the image so that the user can easily make a determination as to the trimmed image.

As a result of the determination in the step S501, when the original image of the piece of image data is in portrait orientation, the CPU 102 carries out the processes in the step S307 and the subsequent steps. As a result of the determination in the step S501, when the original image of the piece of image data is in landscape orientation, the CPU 102 determines the left of the long side, which indicates the left area of the image, as a trimming position (step S502) and ends the present process. When the left of the long side is set as the trimming position, for example, a trimmed image obtained by trimming an area 602 from the image 601 (processed image) in FIG. 6, which is a reduced image of an original image formed based on document data, is displayed as a preview image on the operating unit 107.

According to the process in FIG. 5 described above, when image data is document data, a trimming position is switched based on an image aspect ratio of an original image. Superficially, when image data is document data, and an original image of image data is in portrait orientation, the top of the long side is determined as a trimming position, and when image data is document data, and an original image of image data is in landscape orientation, the left of the long side is determined as a trimming position. As a result, a trimming position is controlled appropriately for a type of an original image of obtained image data.

It should be noted that in the present embodiment, there may be a case where, for example, in the thumbnail display mode, even if the length of the short sides constituting an original image is reduced by a minimum reduction ratio, the length of the short sides cannot be reduced to such a length as to match the corresponding one side of the thumbnail display size. For example, when a minimum reduction ratio of the MFP 100 is 1/16, the MFP 100 can only reduce an original image from 3200×2400 pixels to 200×150 pixels. Therefore, an image with the thumbnail display size of 160×120 pixels cannot be generated as a preview image of an original image. On this occasion, the MFP 100 trims an image with 200×150 pixels, which has been obtained by reducing an original image by a minimum reduction ratio, at a predetermined trimming position and displays the trimmed image as a preview image on the operating unit 107. If the image is not trimmed at a trimming position suitable for the image when generating the trimmed image, a characteristic part of the image is not included in the trimmed image, making it difficult for the user to determine whether or not the trimmed image is one corresponding to the original image.

To cope with this, in the present embodiment, a trimming position is switched based on whether or not an original image can be reduced to the thumbnail display size.

Figure 7:
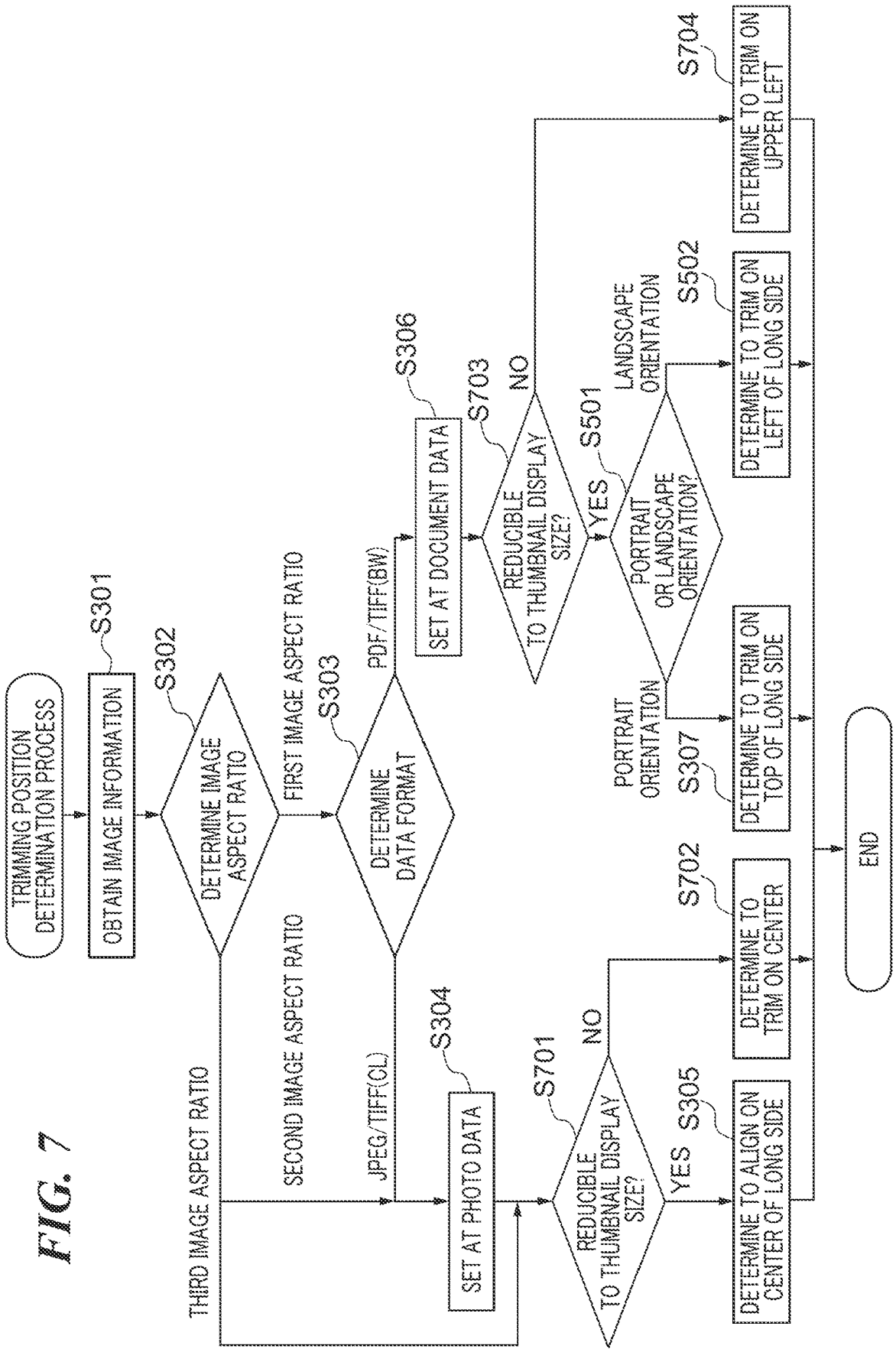
FIG. 7 is a flowchart showing the procedure of a second variation of the trimming position determination process in FIG. 3.

FIG. 7 is a flowchart showing the procedure of a second variation of the trimming position determination process in FIG. 3. The process in FIG. 7 is also implemented by the CPU 102 executing a program stored in the ROM 103 or the like. The process in FIG. 7 is also carried out when the operating unit 107 has received a thumbnail display instruction issued by, for example, the user depressing the thumbnail display icon 205. It should be noted that the process in FIG. 7 is also based on the assumption that a plurality of pieces of image data obtained from the external storage device 115 is stored in the RAM 104. The process in FIG. 7 is also carried out for each piece of image data stored in the RAM 104. In the following description, for example, the process is carried out for a piece of image data stored in the RAM 104.

Referring to FIG. 7, the CPU 102 carries out the processes in the steps S301 and S302. As a result of the determination in the step S302, when the image aspect ratio of the original image is the third image aspect ratio (others), the CPU 102 carries out a process in step S701, to be described later. As a result of the determination in the step S302, when the image aspect ratio of the original image is the first image aspect ratio (regular sizes of printer paper), the CPU 102 carries out the process in the step S303.

As a result of the determination in the step S303, when the data format of the piece of image data is JPEG or TIFF (CL), or as a result of the determination in the step S302, when the image aspect ratio of the original image is the second image aspect ratio (L sizes), the CPU 102 carries out the process in the step S304. Then, the CPU 102 determines whether or not the original image of the piece of image data can be reduced to the thumbnail display size (step S701). Specifically, the CPU 102 determines whether or not the length of any of the sides constituting the original image of the piece of image data can be reduced to the length of the corresponding one side of the thumbnail display size. In the step S701, when the length of any of the sides constituting the original image of the piece of image data can be reduced to the length of the corresponding side of the thumbnail display size, the CPU 102 determines that the original image of the piece of image data can be reduced to the thumbnail display size. On the other hand, in the step S701, when the length of none of all sides constituting the original image of the piece of image data can be reduced to the length of the corresponding side of the thumbnail display size, the CPU 102 determines that the original image of the piece of image data cannot be reduced to the thumbnail display size.

As a result of the determination in the step S701, when the original image of the piece of image data can be reduced to the thumbnail display size, the CPU 102 carries out the processes in the step S305 and the subsequent steps. As a result of the determination in the step S701, when the original image of the piece of image data cannot be reduced to the thumbnail display size, the CPU 102 determines the center, which indicates a central area of the image, as a trimming position (step S702) and ends the present process. When the center is set as the trimming position, for example, a trimmed image obtained by trimming an area 802 from an image 801 (processed image) in JPEG in FIG. 8A, which is a reduced image of an original image formed based on photo data, is displayed as a preview image on the operating unit 107. Thus, in the present embodiment, when the piece of image data is photo data, and the original image of the piece of image data cannot be reduced to the thumbnail display size, the CPU 102 determines the center, which indicates an image central area that is very likely to include a characteristic part of the original image, as a trimming position.

As a result of the determination in the step S303, when the data format of the piece of image data is PDF or TIFF (BW), the CPU 102 carries out the process in the step S306. Then, the CPU 102 determines whether or not the original image of the piece of image data can be reduced to the thumbnail display size (step S703).

As a result of the determination in the step S703, when the original image of the piece of image data can be reduced to the thumbnail display size, the CPU 102 carries out the processes in the steps S501, S307, and S502. As a result of the determination in the step S703, when the original image of the piece of image data cannot be reduced to the thumbnail display size, the CPU 102 determines the upper left as a trimming position (step S704) and ends the present process. When the upper left is set as the trimming position, for example, a trimmed image obtained by trimming an area 804 from an image 803 (processed image) in FIG. 8B, which is a reduced image of an original image formed based on document data, is displayed as a preview image on the operating unit 107. Thus, in the present embodiment, when the piece of image data is document data, and the original image of the piece of image data cannot be reduced to the thumbnail display size, the CPU 102 determines the upper left, which indicates an image's left area that is very likely to include a characteristic part of the original image, as a trimming position.

In the process in FIG. 7 described above, a trimming position is switched based on a result of determination as to whether or not an original image of obtained image data cannot be reduced to the thumbnail display size. As a result, a trimming position is controlled appropriately for the size of an image obtained by reducing an original image of obtained image data.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-140746, filed Jul. 26, 2018, which is hereby incorporated by reference herein in its entirety.

What is claimed is:

1. An image forming apparatus capable of printing based on files of various file types, comprising:
    a display configured to display information; and
    at least one controller configured to function as:
    a unit configured to acquire first file format information for a first file which is a photographic image file stored in a storage, and acquire second file format information for a second file which is a document file stored in the storage;
    a unit configured to acquire information of a first trimming rule for the first file based at least on the first file format information, and acquire information of a second trimming rule for the second file based at least on the second file format information;
    a unit configured to acquire, based on the first file, a first trimmed image trimmed by using the first trimming rule, and acquire, based on the second file, a second trimmed image trimmed by using the second trimming rule; and
    a unit configured to cause the display to display a list screen that shows a preview list of files stored in the storage, wherein the first trimmed image and the second trimmed image are arranged in the list screen,
    wherein the second trimming rule is a rule that a portrait-oriented image based on the second file is trimmed to obtain an area based on a reference position for a top of the portrait-oriented image, and the first trimming rule is a rule that a portrait-oriented image based on the first file is trimmed to obtain an area based on a reference position for a middle of the portrait-oriented image.

2. The image forming apparatus according to claim 1, wherein the first trimmed image includes a part of the portrait-oriented image based on the first file other than an uppermost end and a lowermost end of the portrait-oriented image based on the first file in a height direction of the portrait-oriented image based on the first file, and the second trimmed image includes one end of the portrait-oriented image based on the second file in a height direction of the portrait-oriented image based on the second file.

3. The image forming apparatus according to claim 1, wherein the controller is further configured to function as a determination unit configured to determine a trimming position, wherein the determination unit determines a central area of a first processed image, which is obtained by carrying out an enlarging process or reducing process on the first file, as the trimming position, and determines an upper area of a second processed image, which is obtained by carrying out an enlarging process or reducing process on the second file, as the trimming position.

4. The image forming apparatus according to claim 1, wherein the controller is further configured to function as:
a unit configured to acquire information of a third trimming rule for a third file, the third file being a landscape-oriented image; and
a unit configured to acquire, based on the third file, a third trimmed image trimmed by using the third trimming rule,
wherein the third trimming rule is a rule that the landscape-oriented image is trimmed to obtain an area based on a reference position for a center of the landscape-oriented image.

5. The image forming apparatus according to claim 4,
wherein the landscape-oriented image is trimmed to obtain a central area of the landscape-oriented image according to the third trimming rule,
wherein the central area of the landscape-oriented image includes central parts of both sides of the landscape-oriented image in a height direction of the landscape-oriented image and does not include left and right ends of the landscape-oriented image in a width direction of the landscape-oriented image.

6. The image forming apparatus according to claim 1, wherein the first file is a JPEG file.

7. The image forming apparatus according to claim 1, wherein the second file is a PDF file.

8. The image forming apparatus according to claim 1, wherein the controller causes the display to display another screen that shows a non-trimmed image based on the first file, in a case where the first trimmed image is designated in the list screen.

9. The image forming apparatus according to claim 1, wherein the controller causes the display to display another screen that shows a non-trimmed image based on the second file, in a case where the second trimmed image is designated in the list screen.

10. The image forming apparatus according to claim 1, wherein the storage is an external storage attachable to and detachable from the image forming apparatus.

11. The image forming apparatus according to claim 1, further comprising an image forming device configured to form an image on a sheet.

12. The image forming apparatus according to claim 1, wherein the second trimming rule is a rule that a portrait-oriented image based on the second file is trimmed to obtain an upper area of the portrait-oriented image, wherein the upper area includes an upper end of the portrait-oriented image in a height direction of the portrait-oriented image and upper parts of both sides of the portrait-oriented image in a width direction of the portrait-oriented image and does not include a lower end of the portrait-oriented image in the height direction of the portrait-oriented image.

13. The image forming apparatus according to claim 1, wherein the first trimming rule is a rule that a portrait-oriented image based on the first file is trimmed to obtain a central area of the portrait-oriented image, wherein the central area includes central parts of both sides of the portrait-oriented image in a width direction of the portrait-oriented image and does not include upper and lower ends of the portrait-oriented image in a height direction of the portrait-oriented image.

14. The image forming apparatus according to claim 1, wherein the at least one controller is further configured to function as:

a unit configured to obtain image information including information on an image aspect ratio of an image stored in the storage;
a unit configured to determine whether the image aspect ratio of the image is a predetermined image aspect ratio among a plurality of image aspect ratios; and
a unit configured to determine, in a case where it is determined that the image aspect ratio of the image is the predetermined image aspect ratio among the plurality of image aspect ratios, a file format of the image;
wherein the first trimmed image is acquired based on a determination being made that the file format of the image corresponds to the first file, and the second trimmed image is acquired based on a determination being made that the file format of the image corresponds to the second file.

15. A control method for an image forming apparatus capable of printing based on files of various file types, the image forming apparatus comprising a display configured to display information, a memory storing a program, and at least one processor executing the program to:
acquire first file format information for a first file which is a photographic image file stored in a storage, and acquire second file format information for a second file which is a document file stored in the storage;
acquire information of a first trimming rule for the first file based at least on the first file format information, and acquire information of a second trimming rule for the second file based at least on the second file format information;
acquire, based on the first file, a first trimmed image trimmed by using the first trimming rule, and acquire, based on the second file, a second trimmed image trimmed by using the second trimming rule; and
cause the display to display a list screen that shows a preview list of files stored in the storage, wherein the first trimmed image and the second trimmed image are arranged in the list screen,
wherein the second trimming rule is a rule that a portrait-oriented image based on the second file is trimmed to obtain an area based on a reference position for a top of the portrait-oriented image, and the first trimming rule is a rule that a portrait-oriented image based on the first file is trimmed to obtain an area based on a reference position for a middle of the portrait-oriented image.

16. A non-transitory computer-readable storage medium storing a program for causing a computer to execute a control method for an image forming apparatus capable of printing based on files of various file types, the computer executing the control method to:
acquire first file format information for a first file which is a photographic image file stored in a storage, and acquire second file format information for a second file which is a document file stored in the storage;
acquire information of a first trimming rule for the first file based at least on the first file format information, and acquire information of a second trimming rule for the second file based at least on the second file format information;
acquire, based on the first file, a first trimmed image trimmed by using the first trimming rule, and acquire, based on the second file, a second trimmed image trimmed by using the second trimming rule; and
cause a display to display a list screen that shows a preview list of files stored in the storage, wherein the first trimmed image and the second trimmed image are arranged in the list screen, wherein the second trimming rule is a rule that a portrait-oriented image based on the second file is trimmed to obtain an area based on a reference position for a top of the portrait-oriented image, and the first trimming rule is a rule that a portrait-oriented image based on the first file is trimmed to obtain an area based on a reference position for a middle of the portrait-oriented image.

* * * * *